(12) United States Patent
Gausepohl et al.

(10) Patent No.: US 6,951,901 B2
(45) Date of Patent: Oct. 4, 2005

(54) METHOD FOR CONTINUOUS ANIONIC POLYMERIZATION OF IMPACT-RESISTANT POLYSTYRENE

(75) Inventors: Hermann Gausepohl, Mutterstadt (DE); Jürgen Demeter, Ludwigshafen (DE); Philippe Desbois, Maikammer (DE); Christian Schade, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/492,620

(22) PCT Filed: Oct. 18, 2002

(86) PCT No.: PCT/EP02/11668
§ 371 (c)(1),
(2), (4) Date: Apr. 15, 2004

(87) PCT Pub. No.: WO03/035709
PCT Pub. Date: May 1, 2003

(65) Prior Publication Data
US 2004/0266946 A1 Dec. 30, 2004

(30) Foreign Application Priority Data
Oct. 23, 2001 (DE) .......................................... 101 52 116

(51) Int. Cl.⁷ ............................................. C08F 279/00

(52) U.S. Cl. ............................. 525/53; 525/88; 525/316
(58) Field of Search .............................. 525/53, 88, 316

(56) References Cited

U.S. PATENT DOCUMENTS

| 4,153,647 A | * | 5/1979 | Glukhovskoi et al. |
| 5,700,876 A | * | 12/1997 | Knoll et al. |
| 5,990,236 A | * | 11/1999 | Knoll et al. |
| 6,303,721 B1 | * | 10/2001 | Latsch et al. |
| 6,399,703 B1 | * | 6/2002 | Fischer et al. |
| 6,444,742 B1 | * | 9/2002 | Rong et al. |
| 6,506,846 B1 | * | 1/2003 | Schade et al. |

OTHER PUBLICATIONS

0050/45494=U.S. Appl. No. 08/849,365.*
0050/47677=(DE 197 01 865).*

* cited by examiner

Primary Examiner—Fred Teskin
(74) Attorney, Agent, or Firm—Novak Deuce & Quigg

(57) ABSTRACT

A process for preparing impact-resistant molding compositions by anionic polymerization of vinylaromatic monomers in the presence of a rubber, in a continuous-flow reactor cascade composed of at least two reactors, where the vinylaromatic monomers are fed in substreams to the reactors of the reactor cascade, and an anionic initiator and a rubber are fed at least to the first reactor, and where the reactor cascade is composed of back-mixing reactors.

9 Claims, 1 Drawing Sheet

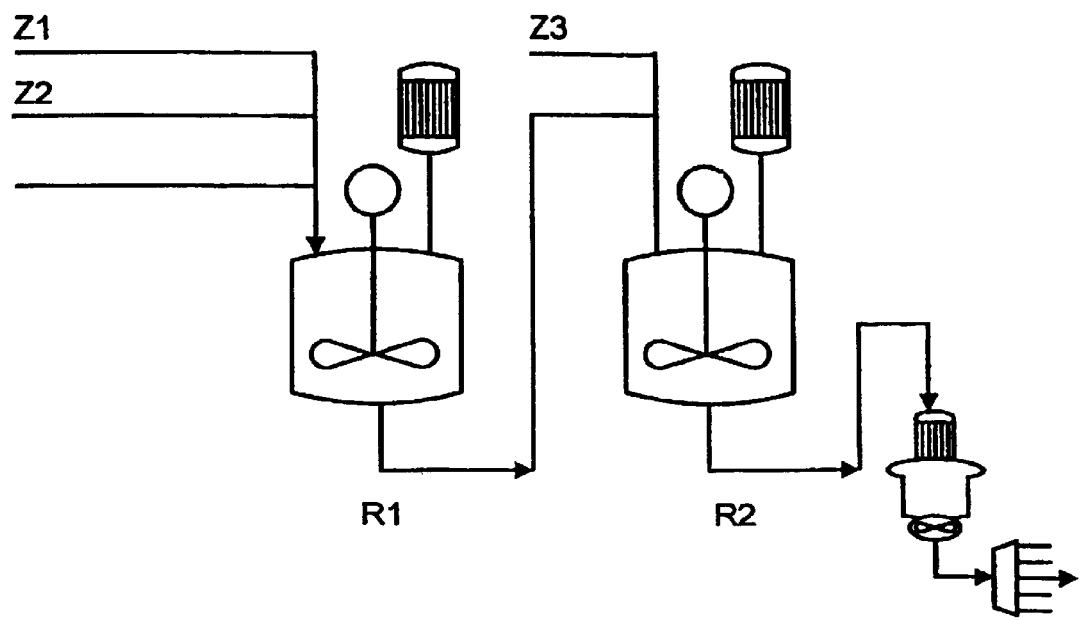

METHOD FOR CONTINUOUS ANIONIC POLYMERIZATION OF IMPACT-RESISTANT POLYSTYRENE

The invention relates to a process for preparing impact-resistant molding compositions by anionic polymerization of vinylaromatic monomers in the presence of a rubber in a continuous-flow reactor cascade composed of at least two reactors.

By way of example, EP-A 595120 or U.S. Pat. No. 4,153,647, discloses processes for preparing impact-resistant molding compositions by anionic polymerization of styrene in the presence of styrene-butadiene block copolymers. The contents of residual monomer and of oligomer in the resultant products are lower than those of products obtained by free-radical polymerization.

EP-A 595121 describes the conversion to a continuous process in the type of tank/tank/tower/tower cascade known from the free-radical polymerization of impact-resistant polystyrene. In this process, the monomer stream is divided between the individual reactors. However, it has been found that when relatively large tower reactors are used the monomeric styrene feed cannot be sufficiently rapidly homogenized with the highly viscous polymer solution, a possible result being uncontrolled reactions.

WO 96/18666 describes a process in which impact-modified polystyrene is polymerized continuously in a single reactor, above the phase-inversion point.

DE-A 19701865 describes another continuous process. The rubber is prepared in a tubular reactor and, after addition of styrene monomers, polymerized in a stirred tank at least to phase inversion, and then polymerized to completion in another tubular reactor.

Because the reaction rates for the anionic polymerization of styrene are high and are associated with considerable heat generation, processes have also been proposed with addition of retardant additives, such as alkyl compounds of alkaline earth metals, of zinc, and of aluminum (e.g. WO 98/07766).

It is an object of the present invention, therefore, to provide a process which is intended for the continuous anionic polymerization of impact-resistant polystyrene and which does not have the abovementioned disadvantages, and which in particular permits controlled conduct of the reaction without retardant additives. Furthermore, it should be possible to carry out the process in simple apparatus, so that investment costs for new plant can be low.

We have found that this object is achieved by way of a process for preparing impact-resistant molding compositions by anionic polymerization of vinylaromatic monomers in the presence of a rubber, in a continuous-flow reactor cascade composed of at least two reactors, where the vinylaromatic monomers are fed in substreams to the reactors of the reactor cascade, and an anionic initiator and a rubber are fed at least to the first reactor, and where the reactor cascade is composed of back-mixing reactors.

Suitable reactors are continuous-flow stirred tanks (CSTRs). They ensure sufficiently rapid and thorough mixing of the feeds with the polymerization mixture and effective dissipation of the heat of reaction through evaporative cooling. The vapors formed in this process generally run back into the reactor. However, it is also possible for a portion of the solvent-containing condensate to be discharged, the heat of reaction being utilized.

In order to achieve high rubber efficiency, the polymerization is preferably carried out in a reactor cascade, composed of two stirred tanks arranged in series, the solids content in the first stirred tank being above the phase-inversion point. The solids content in the first stirred tank is preferably at least twice the proportion by weight of the rubber therein, and in the second stirred tank is preferably from 50 to 85% by weight. The solids content in the first stirred tank preferably exceeds, by from 5 to 30% by weight, twice the proportion by weight of the rubber, i.e. is in the range from 15 to 60% by weight if the proportion of rubber is from 5 to 15% by weight.

In the case of a reactor cascade composed of three stirred tanks, the solids content in the first stirred tank is below the phase-inversion point, in the second stirred tank is at least twice the proportion by weight of the rubber, and in the third stirred tank is in the range from 50 to 85% by weight.

The polymerization preferably takes place isothermally at temperatures in the range from 50 to 170° C., particularly preferably in the range from 70 to 130° C., in the individual reactors of the reactor cascade. Within the reactor cascade here, the temperature is preferably set so as to increase from reactor to reactor.

After discharge from the reactor cascade, the polymerization mixture may be passed through a devolatilizer at temperatures in the range from 200 to 280° C.

Vinylaromatic monomers which may be used are styrene and styrene derivatives, in particular styrene and α-methylstyrene, or a mixture of various styrene derivatives.

The vinylaromatic monomers are fed in substreams to the reactors of the reactor cascade. The monomer conversion in each reactor should be above 95%, preferably above 99%. The monomer conversion determines the amount of heat liberated from the reaction, and the maximum possible monomer feed to the individual reactors is therefore a function of their evaporative cooling capacities. The ratio between the individual substreams depends on the solids content desired in the individual reactors of the reactor cascade.

By dividing the vinylaromatic monomers into substreams it is possible to forego any addition of retarders which reduce the polymerization rate.

In the case of a reactor cascade composed of two stirred tanks R1 and R2 arranged in series, the ratio R2/R1 for division of the vinylaromatic monomer substreams is generally from 0.1 to 15, preferably from 1 to 7, in particular from 3 to 4.

In the case of a reactor cascade composed of three stirred tanks R1, R2, and R3 arranged in series, the division ratios R3/R1 and R2/R1 are generally from 0.1 to 15, preferably from 2 to 10, in particular from 2 to 3.

The inventive process may be carried out in inert solvents, such as aliphatic, cycloaliphatic or aromatic hydrocarbons, or a mixture of these. Preferred hydrocarbons are those having from 3 to 12 carbon atoms. Preferred solvents are toluene, cyclohexane, or methylcyclohexane.

Anionic polymerization initiators which may be used are the conventional mono-, bi-, or multifunctional alkyl, aryl, or aralkyl compounds of alkali metals. Preference is given to organolithium compounds, such as ethyl-, propyl-, isopropyl-, n-butyl-, sec-butyl-, tert-butyl-, phenyl-, diphenylhexyl-, hexamethyldi-, butadienyl-, isoprenyl-, or polystyryllithium, or else 1,4-dilithiobutane, 1,4-dilithiobut-2-ene, or 1,4-dilithiobenzene. The amount needed depends on the desired molecular weight. It is generally in the range from 0.001 to 5 mol %, based on the total amount of monomer.

In alkylaromatic solvent, when considering a particular molecular weight to be achieved, substoichiometric amounts may also be sufficient, because transfer reactions to the solvent take place. Depending on the polymerization temperature, up to 50% can be saved, based on the stoichiometric amount.

The anionic initiator is fed at least to the first reactor. However, it may also be divided in substreams in any desired ratio over the various reactors of the reactor cascade. This makes it possible to achieve bi- or multimodal molecular weight distributions for the vinylaromatic hard matrix.

To accelerate the reaction, Lewis bases, such as tetrahydrofuran, tertiary amines, or soluble potassium salts, may be added.

The rubber is likewise fed at least to the first reactor. Because unlike in free-radical polymerization no grafting occurs during anionic polymerization, the rubber used should be compatible with the vinylaromatic matrix.

Suitable rubbers are styrene block copolymers having at least one block composed of dienes, such as butadiene, methylbutadiene, or isoprene, or else having copolymer blocks composed of dienes and styrene with random structure.

The rubber used preferably comprises styrene-butadiene block copolymers or a mixture of a styrene-butadiene block copolymer with a polybutadiene. The rubber preferably has a solution viscosity of 120 ml/g or below, preferably below 85 ml/g, measured on a 5% strength by weight solution in styrene.

The diene content of the rubbers is generally in the range from 10 to 90% by weight, preferably in the range from 65 to 75% by weight. The amount of rubber used is preferably that which leads to a diene content in the range from 6 to 12% by weight, based on the impact-resistant molding composition.

The rubber used particularly preferably comprises a styrene-butadiene two-block or styrene-butadiene-styrene three-block copolymer having at least one styrene block with a number-average molar mass $M_n$ of at least 35 000 g/mol, preferably at least 70 000 g/mol.

The rubbers used may be prepared batchwise by the known processes of sequential anionic polymerization. The solvent used preferably comprises the solvent also used for polymerization of the vinylaromatic hard matrix.

The rubber is preferably fed directly to the reactor cascade, without isolation, where appropriate after chain termination by a protic substance or Lewis acid, for example water, alcohols, aliphatic or aromatic carboxylic acids, or else inorganic acids or carbon dioxide, or via reaction with bi- or multifunctional coupling agents, such as polyfunctional aldehydes, ketones, esters, anhydrides, or epoxides. This has the particular advantage that the rubber solution is free from traces of water and from stabilizers, and that the continuous anionic polymerization of the vinylaromatic compounds in the presence of this rubber solution leads to relatively constant molecular weights for the hard matrix.

BRIEF DESCRIPTION OF THE DRAWING(S)

The drawing depicts a reactor cascade comprising two stirred reactors as employed in the following examples.

EXAMPLES

Preparation of the Rubber Solutions

Styrene-butadiene-styrene three-block copolymers were prepared by sequential anionic polymerization in toluene and initiation by sec-butyllithium (s-BuLi). After the polymerization reaction, isopropanol was used for termination. The rubber solution was then diluted with styrene.

Rubber Solution K1

The solution comprised 130 kg of an SBS three-block copolymer with block lengths 11 000–145 000–40 000 g/mol in 390 kg of toluene and 130 kg of styrene.

Rubber Solution K2

The solution comprised 80 kg of an SBS three-block copolymer with block lengths 12 000–168 000–57 000 g/mol in 240 kg of toluene and 116 kg of styrene.

Preparation of the Impact-resistant Polystyrenes

The reactor cascade (FIG. 1) used for the polymerization reaction was composed of two stirred tanks R1 and R2 whose volume was 1 and, respectively, 1.9 liters, each equipped with an anchor stirrer. The styrenic rubber solution and the initiator were fed via separate supply lines Z1 and Z2 to the stirred tank R1.

Further monomeric styrene was fed via Z3 to the second stirred tank R2. Once equilibrium had been achieved, the polymerization was carried out continuously at constant temperatures in the stirred tanks R1 and R2, using the parameters stated in Table 1. The throughput was about 800 g/h, based on the impact-resistant polystyrene. This had a butadiene content of from about 8 to 10% by weight, based on the impact-resistant polystyrene. After discharge from the second stirred tank, the polymer solution was terminated with 10 g/h of a 1:1 methanol/water mixture through a static mixer, and treated with 0.3% by weight of Irganox 1076 and 2.5% by weight of mineral oil, based in each case on the impact-resistant polystyrene. The polymer melt was then devolatilized by way of a Dow pot and pelletized.

The properties of the impact-resistant polystyrenes are given in Table 2.

TABLE 1

Experimental parameters for the preparation of impact-resistant polystyrene

| | Example | | |
|---|---|---|---|
| | 1 | 2 | 3 |
| Rubber | K1 | K2 | K2 |
| Rubber feed [g/h] | 637 | 689 | 551 |
| Initiator | s-BuLi | n-BuLi | n-BuLi |
| Initiator feed [g/h] | 11 | 12.7 | 14.5 |
| Styrene feed in R2 [g/h] | 545 | 493 | 555 |
| Solids content in R1 [%] | 38 | 43 | 43 |
| Solids content in R2 [%] | 67 | 67 | 71 |
| Temperature in R1 [° C.] | 65 | 60 | 80 |
| Temperature in R2 [° C.] | 87 | 67 | 86 |

TABLE 2

Properties of the impact-resistant polystyrenes of Examples 1–3:

| | Example | | |
|---|---|---|---|
| | 1 | 2 | 3 |
| Yield stress [N/mm$^2$] | 27.3 | 19.6 | 28.5 |
| Elongation [%] | 11.7 | 29 | 11.0 |
| Hole-notch impact strength [%] | 11.4 | 11.4 | 17.4 |
| Residual styrene content [ppm] | <5 | <5 | <5 |
| Iodine number g/100 g | 40.3 | 43.5 | 33.1 |
| Mn [kg/mol] | 58 | 65 | 53 |
| Mw [kg/mol] | 178 | 189 | 188 |
| Mn (theory) [kg/mol] | 350 | 284 | 265 |

We claim:

1. A process for preparing impact-resistant molding compositions by anionic polymerization of vinylaromatic monomers in the presence of a rubber, in a continuous-flow reactor cascade composed of at least two reactors, where the vinylaromatic monomers are fed in substreams to the reactors of the reactor cascade, and an anionic initiator and a rubber are fed at least to the first reactor, which comprises using a reactor cascade composed of back-mixing reactors, and which comprises monomer conversion of above 95% in each reactor, and wherein the polymerization is carried out without addition of retarders which reduce the polymerization rate.

2. A process as claimed in claim 1, wherein the reactor cascade is composed of two stirred tanks, and the solids content for the polymerization reaction in the first stirred tank is above the phase-inversion point.

3. A process as claimed in claim 2, wherein the solids content in the first stirred tank is at least twice the proportion by weight of the rubber, and in the second stirred tank is in the range from 50 to 85 percent by weight.

4. A process as claimed in claim 1, wherein the reactor cascade is composed of three stirred tanks, and the solids content in the first stirred tank is below the phase-inversion point, and in the second stirred tank is at least twice the proportion by weight of the rubber, and in the third stirred tank is in the range from 50 to 85 percent by weight.

5. A process as claimed in claim 1, wherein the polymerization is carried out in an aliphatic, cycloaliphatic, or aromatic hydrocarbon.

6. A process as claimed in claim 1, wherein polymerization takes place isothermally at temperatures in the range from 50 to 170° C. in the individual reactors.

7. A process as claimed in claim 1, wherein the rubber used comprises a styrene-butadiene block copolymer or a mixture of a styrene-butadiene block copolymer with a polybutadiene, the solution viscosity of the rubber being 120 ml/g or below, measured on a 5% strength by weight solution in styrene.

8. A process as claimed in claim 1, wherein the rubber used comprises a styrene-butadiene two-block or styrene-butadiene-styrene three-block copolymer having at least one styrene block with a number-average molar mass $M_n$ of at least 35 000 g/mol.

9. A process as claimed in claim 1, wherein the rubber is prepared by anionic polymerization in a solvent, and is fed directly, without isolation, to the reactor cascade.

* * * * *